United States Patent
deLesdernier et al.

(10) Patent No.: US 8,025,792 B2
(45) Date of Patent: Sep. 27, 2011

(54) SPRAY NOZZLES

(75) Inventors: Daniel T. deLesdernier, Greenfield, MA (US); Matthew P. Betsold, Northfield, MA (US); Douglas J. Dziadzio, Montague, MA (US); John D. Pulaski, Swanzey, NH (US); Thomas A. Bassett, Florence, MA (US)

(73) Assignee: Bete Fog Nozzle, Inc., Greenfield, MA (US)

(*) Notice: Subject to any disclaimer, the term of this patent is extended or adjusted under 35 U.S.C. 154(b) by 855 days.

(21) Appl. No.: 12/030,402

(22) Filed: Feb. 13, 2008

(65) Prior Publication Data
US 2008/0191056 A1    Aug. 14, 2008

Related U.S. Application Data

(60) Provisional application No. 60/901,151, filed on Feb. 13, 2007.

(51) Int. Cl.
C10G 11/00 (2006.01)
B01J 8/18 (2006.01)

(52) U.S. Cl. ........................... 208/113; 422/140
(58) Field of Classification Search .............. 208/140, 208/113; 422/140
See application file for complete search history.

(56) References Cited

U.S. PATENT DOCUMENTS

| | | |
|---|---|---|
| 2,700,576 A | 1/1955 | Salsas-Serra et al. |
| 3,974,091 A | 8/1976 | Parker et al. |
| 4,032,300 A | 6/1977 | Parker et al. |
| 4,097,243 A * | 6/1978 | Bartholic ............ 422/140 |
| 4,322,384 A | 3/1982 | Sutton |
| 4,369,849 A | 1/1983 | Parrish |
| 4,443,551 A | 4/1984 | Lionetti et al. |
| 4,452,324 A | 6/1984 | Jürgens |
| 4,843,050 A | 6/1989 | Rahlwes et al. |
| 4,875,996 A | 10/1989 | Hsieh et al. |
| 4,994,239 A | 2/1991 | Skraba |
| 5,017,536 A | 5/1991 | Skraba |
| 5,033,681 A | 7/1991 | Munoz |
| 5,474,235 A | 12/1995 | Cole et al. |
| 5,704,554 A | 1/1998 | Cooper et al. |

(Continued)

OTHER PUBLICATIONS

International Search Report and Written Opinion of the International Searching Authority for International Application No. PCT/US08/53827.

Primary Examiner — Glenn Caldarola
Assistant Examiner — Randy Boyer
(74) Attorney, Agent, or Firm — McCarter & English, LLP (57) ABSTRACT

A spray nozzle for discharging at least one fluid in a spray pattern into a fluid stream in a vessel, such as an atomized mixture of oil and steam in a fluidic catalytic cracking unit, wherein the nozzle alters the flow patterns of the fluid stream in the vicinity of the nozzle to inhibit erosion of the nozzle and maintain the spray pattern. The nozzle comprises an inlet member defining at least one inlet conduit and an outlet member in fluid communication with the inlet member. The outlet member includes an exterior surface and a plurality of bosses angularly spaced relative to each other about an axis of the outlet, each boss defining an outlet aperture in fluid communication with the at least one inlet conduit having a length (L) and a diameter (D) and an axially extending wall, wherein the axially extending wall extends outwardly a length (X) greater than about ⅛ inch relative to the exterior surface and L/D is at least about ½.

35 Claims, 11 Drawing Sheets

U.S. PATENT DOCUMENTS

| | | |
|---|---|---|
| 6,042,717 A | 3/2000 | Radcliffe et al. |
| 6,142,248 A | 11/2000 | Thigpen et al. |
| 6,763,902 B2 | 7/2004 | Larsen et al. |
| 7,108,195 B2 | 9/2006 | Geertshuis et al. |
| 2004/0195395 A1 | 10/2004 | McLaughlin |
| 2005/0214474 A1 | 9/2005 | Han et al. |
| 2005/0279863 A1 | 12/2005 | Malcolm |
| 2006/0016726 A1 | 1/2006 | Steffens et al. |
| 2006/0049282 A1 | 3/2006 | Bowman et al. |
| 2006/0144758 A1 | 7/2006 | Swan, III et al. |
| 2006/0273205 A1 | 12/2006 | Wang et al. |

* cited by examiner

*FIG. 9A*

SPRAY NOZZLES

CROSS REFERENCE TO RELATED APPLICATIONS

This application claims priority to U.S. Provisional Application No. 60/901,151, filed Feb. 13, 2007, and relates to U.S. application Ser. No. 11/606,591, filed Nov. 29, 2006, which claims priority to U.S. Provisional Application No. 60/741,022, filed Nov. 29, 2005, all of which are hereby incorporated by reference in their entireties as part of the present disclosure.

FIELD OF THE INVENTION

The present invention relates to spray nozzles, and more particularly, to spray nozzles that discharge at least one fluid in an atomized spray and, more particularly, to spray nozzles that inhibit erosion and maintain a consistent spray pattern when erosion occurs.

BACKGROUND

Fluidized catalytic cracking (FCC) is one of the major refining methods used in the oil refining industry. The FCC process is employed to crack materials consisting essentially of petroleum-type hydrocarbons to produce products such as fuels for internal combustion engines and heating oils. The cracking process is usually performed in a vertically oriented conduit, or riser including a reactor vessel, that forms part of an FCC system. During the process, hot catalyst particles in an aerated (fluidized) state are typically introduced into a bottom portion of the riser and induced to flow upward. A hydrocarbon feedstock is mixed with steam to become partially fluidized and injected into the catalyst flow as the catalyst travels through the riser, which creates cracking reactions that breakdown the hydrocarbon feedstock into a simpler (lighter) molecular form.

Optimal cracking conditions in an FCC process require a substantially immediate and homogenous mixing of the catalyst and the hydrocarbon feedstock. Such mixing is difficult to achieve, however, and stratified regions of hot catalyst and cold hydrocarbon feedstock typically appear within the catalyst-hydrocarbon flow. Over-cracking and thermal cracking of the hydrocarbon molecules typically occur in the catalyst-rich areas of the flow. Conversely, incomplete cracking of the hydrocarbon molecules usually occurs in hydrocarbon-rich flow regions. These factors can substantially reduce the overall yield of the FCC process. In addition, over-cracking, thermal cracking, and incomplete cracking have undesirable side-effects such as deactivation of the catalyst within the riser due to coke laydown, regeneration of the catalyst within the regenerator due to the combustion of air and residual coke, and the production of excessive amounts of lower-boiling-range gaseous reaction products, e.g., propane and butane gases.

Hence, effective methods for mixing the catalyst and the hydrocarbon feedstock within the reactor vessel are critical to the cracking process, as proper mixing is predicating upon maintaining a constant spray pattern of the hydrocarbon feed stock. The spray pattern is achieved by constraining flow through carefully shaped flow passages. Should the shape of the passages change, the length to diameter ratio (L/D) of the flow passages is altered, which in turn changes the spray pattern. Changes in the geometry and L/D ratio occur most frequently as a result of the erosion of the nozzle material by the moving catalyst of the fluid bed of the riser in which the nozzle is installed.

To ensure proper mixing, spray nozzles have been devised that introduce the hydrocarbon-steam mixture into the upward flowing catalyst; however, the nozzles currently available for use in FCC units have significant limitations. First, the nozzles can generate an uneven spray pattern that reduces liquid contact between the hydrocarbon-steam mixture and the catalyst, which in turn impedes homogeneous mixing leading to over-cracking, thermal cracking and/or incomplete cracking of the hydrocarbon molecules. Second, the nozzles are susceptible to erosion, which significantly alters the nozzle's internal flow passages resulting in altered spray patterns, which can in turn reduce the consistency and overall output of the yield of the FCC process. Similar limitations are present in other refining processes that utilize nozzles to introduce fluids into a mixing vessel, such as reduced crude conversion (RCC) processes.

Figure 1A:
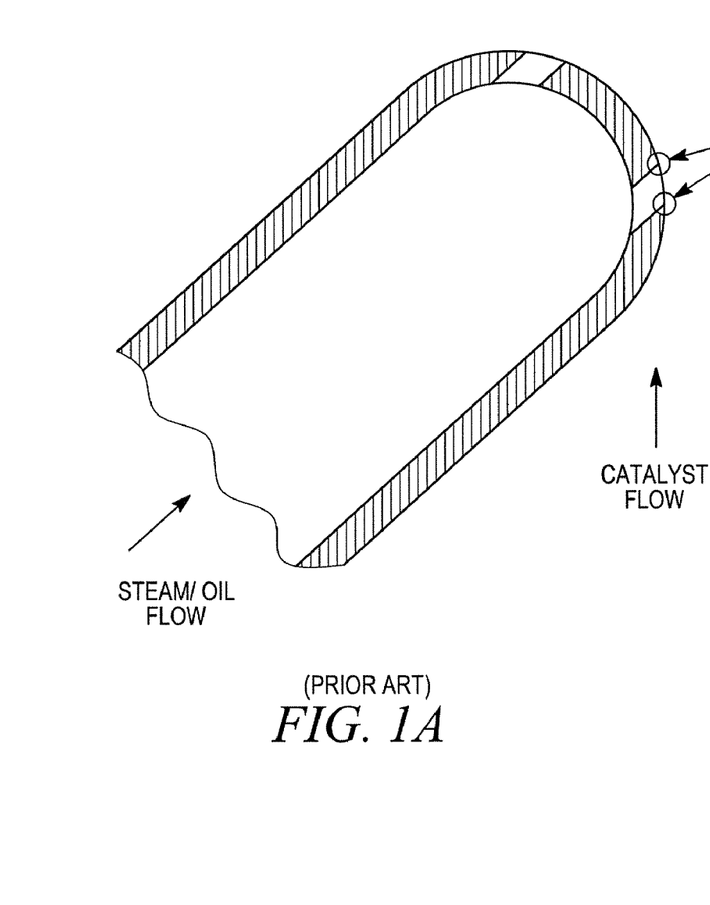
FIG. 1A is a partial side cutaway view of a prior art nozzle without bosses indicating the areas prone to erosion.
Figure 1B:
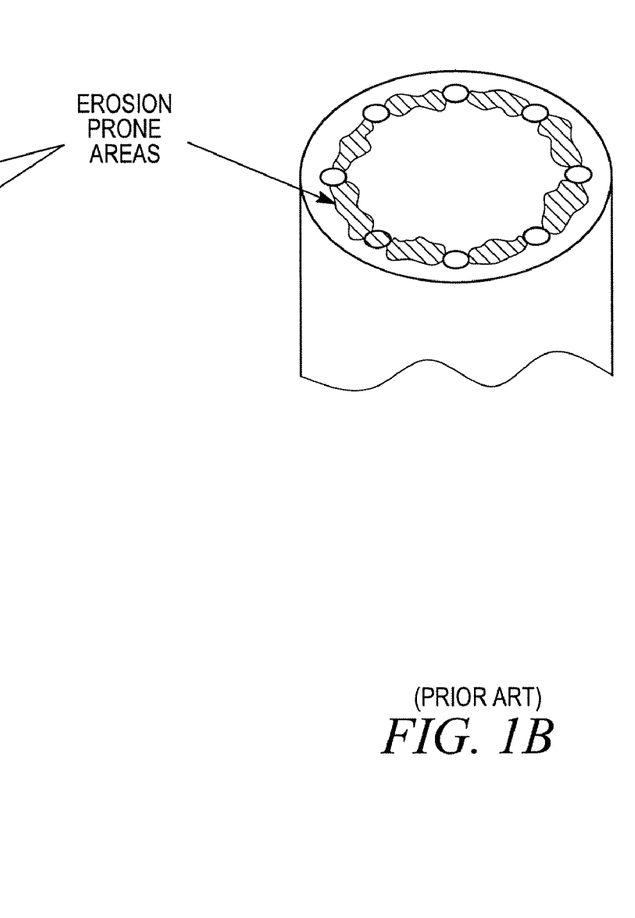
FIG. 1B is a top perspective view of the nozzle of FIG. 1A.

For example, U.S. Pat. No. 5,553,783 describes a feed distributor nozzle for a fluid catalytic cracker. In highly erosive environments the outside surface can wear and the wear can extend to the interior of the holes as the outside wears (FIGS. 1A and 1B). When the holes change shape by being effectively shortened, they can no longer direct the spray as intended to maintain the desired spray pattern, typically a flat fan spray. With increasing depth of erosion, the flat fan spray becomes ill-defined and, eventually, the spray pattern morphs into an undesirable spray patter such as narrow cone pattern, which significantly reduces the overall efficiency of the FCC and RCC processes.

Figure 2A:
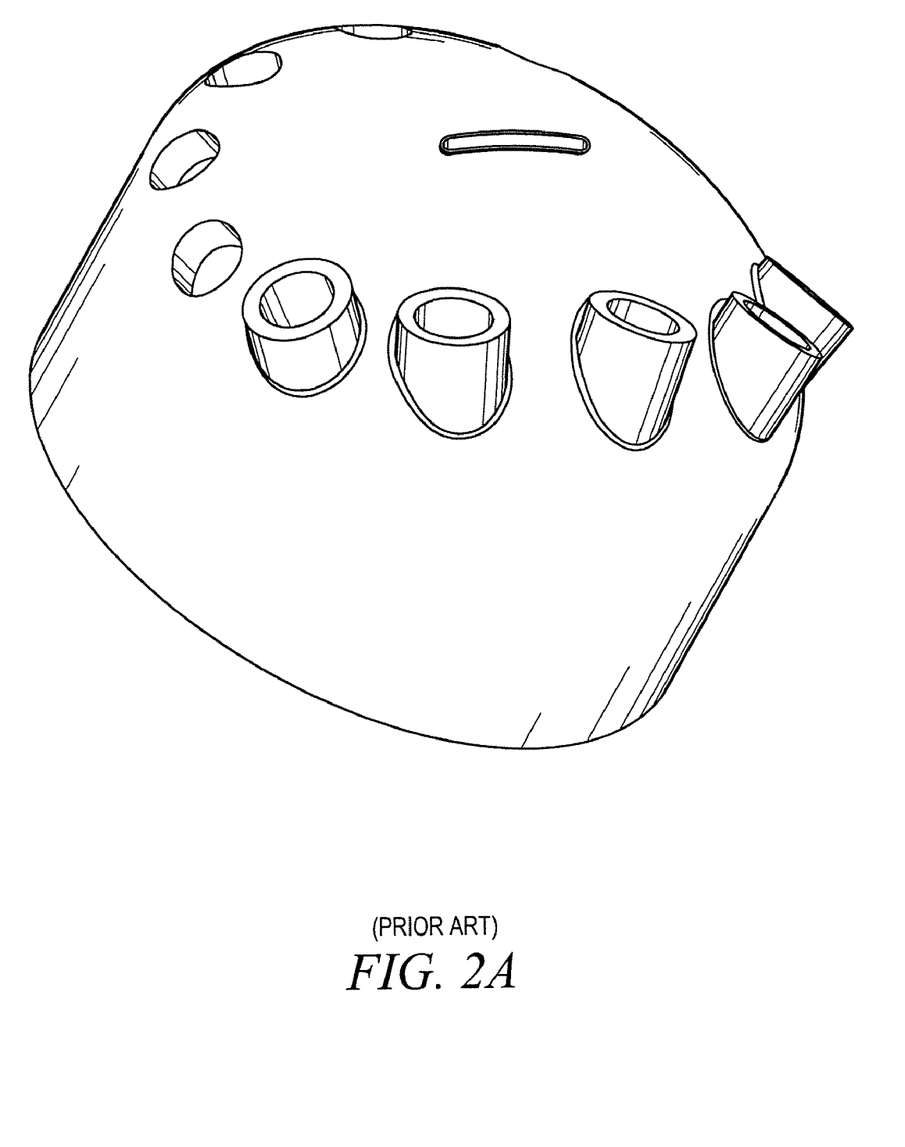
FIG. 2A is a top/side perspective view of a prior art nozzle skewed boss pattern.
Figure 2B:
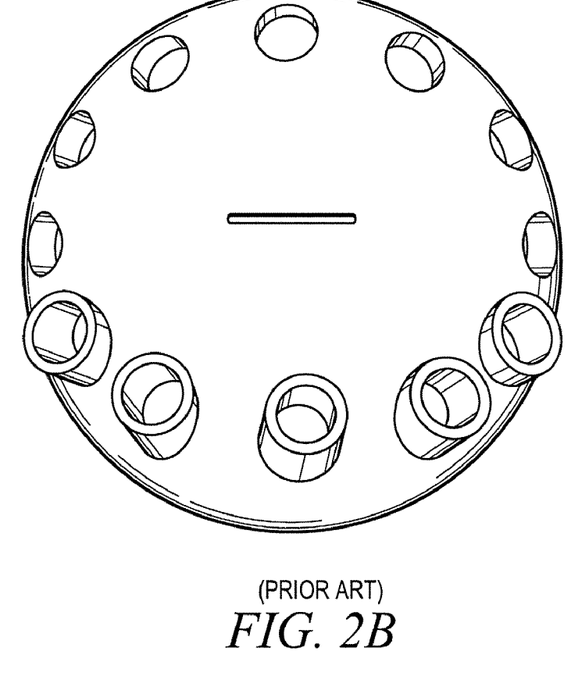
FIG. 2B is a top view of the nozzle of FIG. 2A.
Figure 2C:
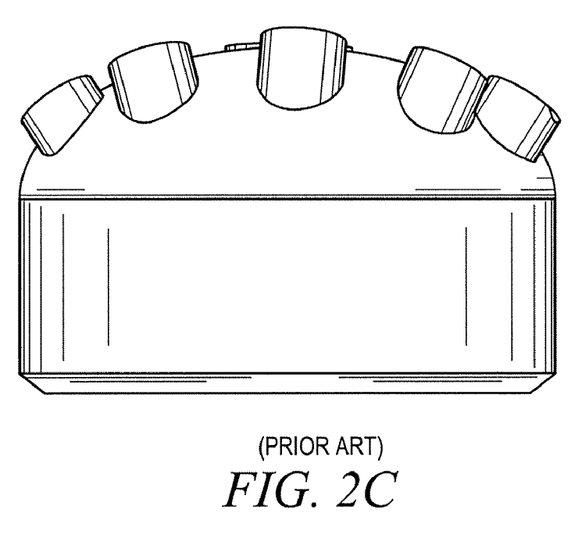
FIG. 2C is a side view of the nozzle of FIG. 2A.
Figure 3A:
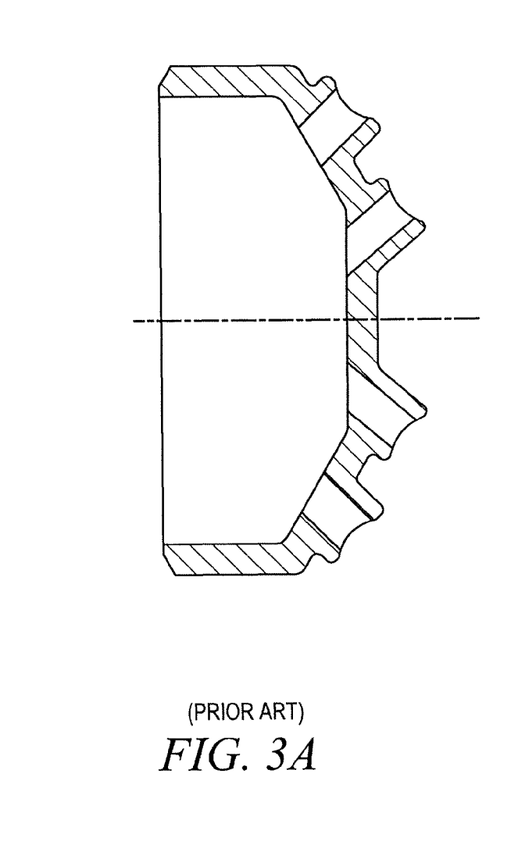
FIG. 3A is a partial top view of a prior art nozzle having a "cats eye" boss configuration.
Figure 3B:
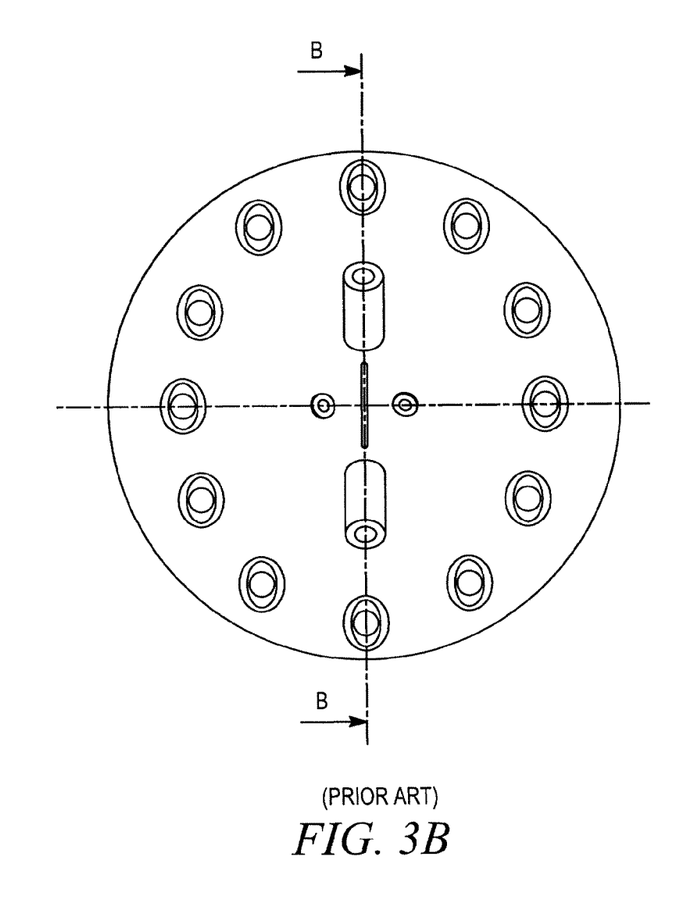
FIG. 3B is a partial side cutaway view of nozzle of FIG. 3A taken along line A-A.
Figure 4A:
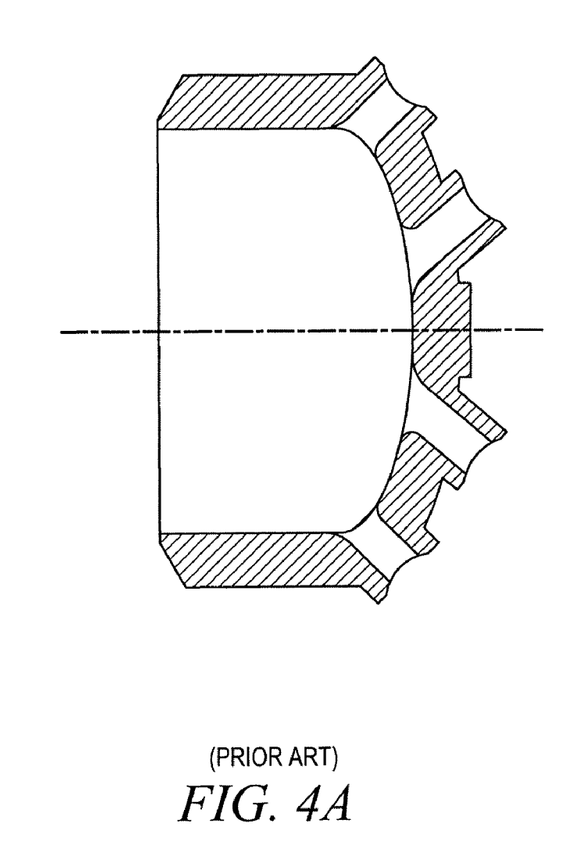
FIG. 4A is a top view of a prior art nozzle showing an alternative "cats eye" boss configuration.
Figure 4B:
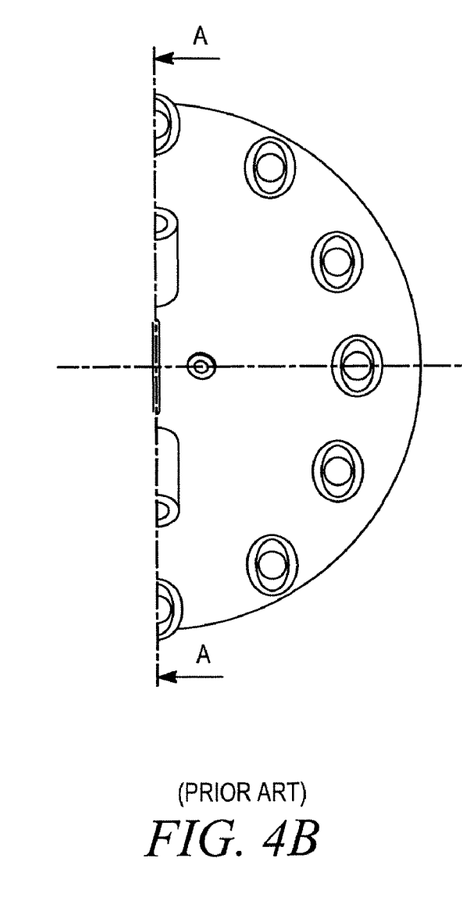
FIG. 4B is a partial side cut away view of nozzle of FIG. 3A taken along line B-B.
Figure 5A:
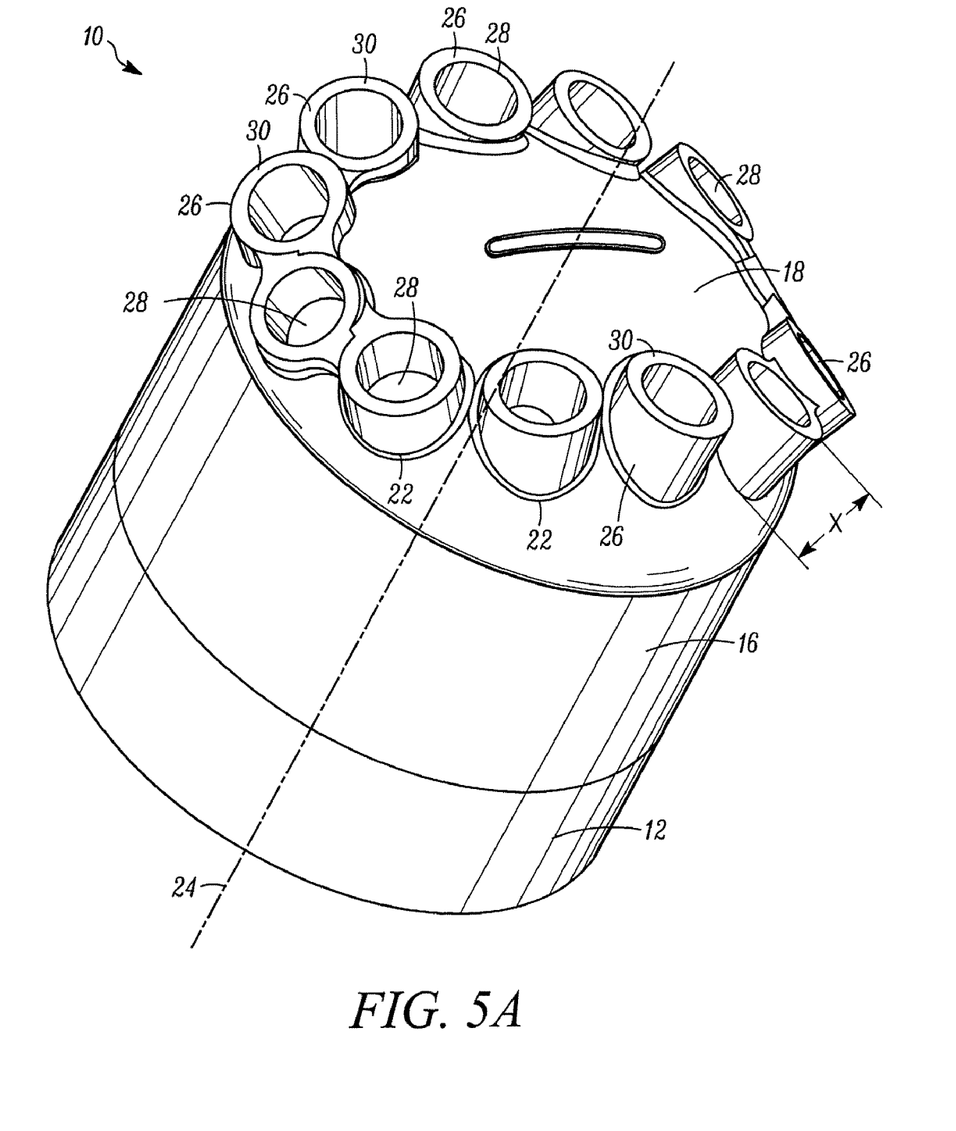
FIG. 5A is a top/side perspective view of a nozzle of the present invention.
Figure 5B:
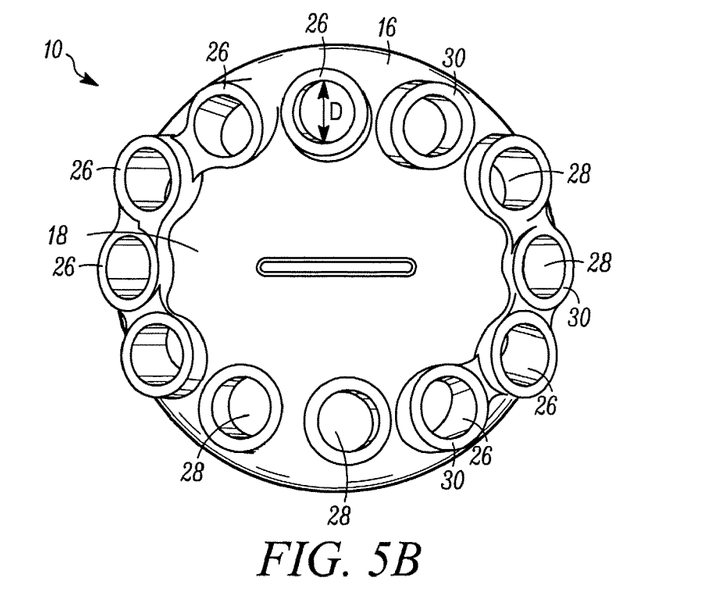
FIG. 5B is a top view of the nozzle of FIG. 5A.
Figure 5C:
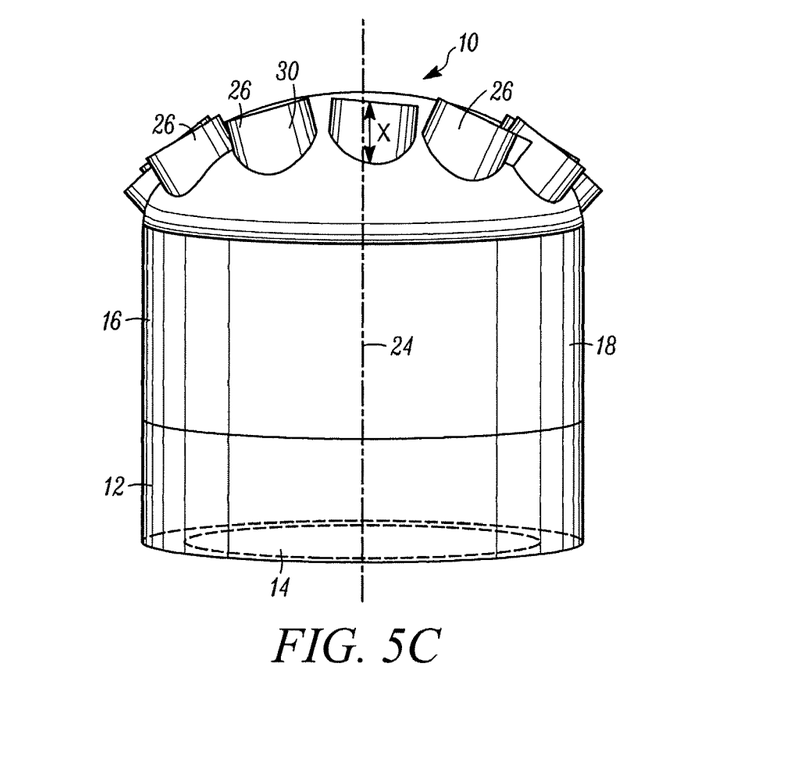
FIG. 5C is a side view of the nozzle of FIG. 5A.

For the purpose of directing the spray pattern, nozzle covers have been devised that incorporate external bosses (see FIGS. 2A-C, 3A-B and 4A-B); however, none of these configurations are designed to maintain the minimum L/D tolerances required for consistent spray patterns when used in applications that erode the nozzle, such as FCC and RCC applications. For example, in the nozzle shown in FIGS. 2A-C, the bosses have varying L/D ratios designed to direct the spray pattern even with the hole pattern skewed of axis, however the varying L/D ratios make it impossible to maintain a consistent spray pattern if the nozzle erodes. Further, in the nozzles shown in FIGS. 3A-B and 4A-B, the bosses incorporate a "cats-eye" configuration with flow passages having varying L/D ratios, which are designed to provide individual small flat fan spray patterns of varying diameters, but as with the previously described nozzle, is not capable of maintaining a consistent spray pattern if the nozzle erodes.

Therefore, to improve the yield of FCC and other refining processes and reduce maintenance expenses associated with frequent nozzle replacements, there is a need for a spray nozzle that generates a consistently flat spray pattern for improved homogeneous mixing, reduces down stream low pressure zones and eddy currents to minimize catalyst erosion and maximize the flow area of the catalyst, and is capable of maintaining a minimum L/D ratio required as the nozzle erodes to maintain the desired spray pattern for an extended period of time.

SUMMARY OF THE INVENTION

In accordance with a first aspect, the present invention is directed to a spray nozzle for discharging at least one fluid in a spray pattern into a fluid stream in a vessel, wherein the nozzle alters the flow patterns of the fluid stream in the vicinity of the nozzle to inhibit erosion of the nozzle and maintain the spray pattern. The nozzle comprises an inlet defining at least one inlet conduit an outlet in fluid communication with the inlet, the outlet defining an exterior surface. Further, the outlet defines a plurality of bosses angularly spaced relative to each other about an axis of the outlet, each boss defining an outlet aperture in fluid communication with the at least one inlet conduit and an axially extending wall, wherein the axially extending wall extends outwardly a length (X) greater than about ⅛ inch relative to the exterior surface. The inlet conduit has length (L) and a diameter (D) and L/D is at least about ½.

In accordance with another aspect, the present invention is directed towards a nozzle for discharging atomized mixture of a liquid and a gas in at least one of a fluidic catalytic cracking vessel and a reduced crude conversion vessel. The nozzle comprises an inlet defining at least one inlet conduit an outlet in fluid communication with the inlet, the outlet defining an exterior surface. Further, the outlet includes a plurality of bosses angularly spaced relative to each other about an axis of the outlet, each boss defining an outlet aperture in fluid communication with the at least one inlet conduit and an axially extending wall, wherein the axially extending wall extends outwardly a length (X) greater than about ⅛ inch relative to the exterior surface. The inlet conduit has length (L) and a diameter (D) and L/D is at least about ½.

In accordance with another aspect, the present invention, approximately all the flow axes of the outlet apertures are directed toward a target within the vessel for atomizing and directing a mixture of the first and second fluids in a spray pattern flowing in a direction across the target. Further, the target is substantially located within a plane extending in the flow direction of the spray pattern.

In accordance with another aspect, the present invention is directed towards a nozzle for discharging atomized mixture of a liquid and a gas in at least one of a fluidic catalytic cracking vessel and a reduced crude conversion vessel. The nozzle comprises an inlet defining at least one inlet conduit an outlet in fluid communication with the inlet, the outlet defining an exterior surface. Further, the nozzle includes a plurality of boss members, each boss member fitted within a respective aperture and defining an outlet aperture in fluid communication with the at least one inlet conduit having a length (L) and a diameter (D) and an axially extending wall, wherein the axially extending wall extends outwardly a length (X) greater than about ⅛ inch relative to the exterior surface and L/D is at least about ½.

In accordance with yet another aspect, the present invention is directed towards a spray nozzle for discharging at least one fluid in a spray pattern into a fluid stream in a vessel. The nozzle comprises a first means for receiving the at least one fluid, a second means in fluid communication with the first means for emitting the at least one fluid in a spray pattern therefrom, and a third means in fluid communication with at least one of the first and second means for altering flow patterns of the fluid stream in the vicinity of the nozzle to inhibit erosion of the nozzle and maintain the spray pattern. In such an embodiment, the first means is an inlet member defining at least one inlet conduit for receiving the at least one fluid, the second means an outlet member in fluid communication with the inlet member, the outlet member defining an exterior surface and a plurality of apertures angularly spaced relative to each other about an axis of the outlet, and the third means is a plurality of boss members, each boss member fitted within a respective aperture and defining an outlet aperture having a length (L) and a diameter (D) and an axially extending wall, wherein the axially extending wall extends outwardly a length (X) greater than about ⅛ inch relative to the exterior surface and L/D is at least about ½.

In accordance with yet another aspect, the present invention is directed towards a spray nozzle for discharging at least one fluid in a spray pattern into a fluid stream in a vessel, wherein the nozzle alters the flow patterns of the fluid stream in the vicinity of the nozzle to inhibit erosion of the nozzle and maintain the spray pattern. The nozzle comprises an inlet defining at least one inlet conduit, and an outlet in fluid communication with the inlet, the outlet defining an exterior surface and two wall members forming a single continuous boss around a central axis of the outlet. The continuous boss defining a plurality of outlet apertures having a length (L) and a diameter (D) angularly spaced relative to each other about the central axis of the outlet and in fluid communication with the at least one inlet conduit. Furthermore, the wall members extend outwardly a length (X) greater than about ⅛ inch relative to the exterior surface and L/D is at least about ½.

In accordance with still another aspect, the present invention is directed towards a method of maintaining a spray pattern of at least one fluid sprayed by a nozzle into a fluid stream of a vessel as the nozzle erodes and inhibiting erosion of the nozzle. The method comprises the steps of providing a spray nozzle for discharging at least one fluid in a spray pattern into the vessel, wherein the spray nozzle comprises an inlet member defining at least one inlet conduit for receiving at least one fluid, and an outlet member in fluid communication with the inlet member. The outlet member defines an exterior surface and a plurality of apertures angularly spaced relative to each other about an axis of the outlet member. A fluid stream is introduced into the vessel. A plurality of boss members are provided, each boss member fitted within a respective aperture and defining an outlet aperture in fluid communication with the at least one inlet conduit having a length (L) and a diameter (D) and an axially extending wall, wherein the axially extending wall extends outwardly a length (X) greater than about ⅛ inch relative to the exterior surface and L/D is at least about ½. Finally, an L/D ratio at about ½ is maintained for a prolonged period as the nozzle erodes.

One advantage of the nozzle is that the inclusion of angularly spaced bosses modifies catalyst flow patterns in the FCC vessel in the vicinity of the nozzle and makes nozzle less prone to (inhibits) the negative effects of erosion that occur in FCC processes or the like, thereby increasing the useful life of the nozzles in comparison to prior art spray nozzles. Another advantage of the nozzle is that the boss configuration maintains a minimum L/D ratio of at least about ½, which in turn, allows the nozzle to discharge the at least one fluid in a consistently flat spray pattern into the catalyst or fluid stream in the vessel for an extended life cycle as erosion occurs. Yet another advantage of the nozzle is that by maintaining a flat spray pattern, the FCC process becomes more efficient, as the fluid discharged from the nozzle interacts with the catalyst in a more consistent manner.

Other objects and advantages of the present invention will become more readily apparent in view of the following detailed description of the currently preferred embodiments and accompanying drawings.

DETAILED DESCRIPTION OF THE INVENTION

In FIGS. 5-7 and 10 a first embodiment of a nozzle of the present invention is indicated generally by the reference numeral 10. The nozzle 10 is for discharging at least one fluid in a spray pattern into a fluid stream in a vessel (not shown) and alters the flow patterns of the fluid stream in the vicinity of the nozzle to inhibit erosion of the nozzle and maintain the spray pattern. In one embodiment of the present invention, the nozzle discharges an atomized mixture of a first and second fluid. In one example thereof, the first fluid is oil, the second fluid is gas or steam, and the vessel is a catalytic cracking vessel. However, as may be recognized by those of ordinary skill in the pertinent art based on the teachings herein, the nozzles of the present invention are equally usable with any of numerous different types of fluids in connection with any of numerous different types of applications that are currently known, or that later become known.

Figure 9A:
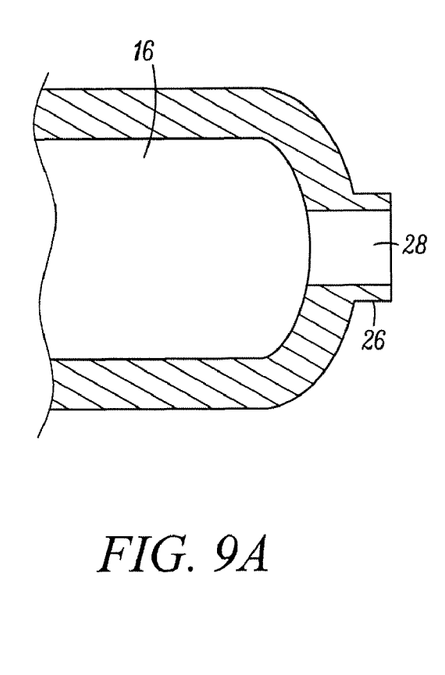
FIG. 9A is a partial side cutaway view of an embodiment of the nozzle of the present invention.
Figure 9B:
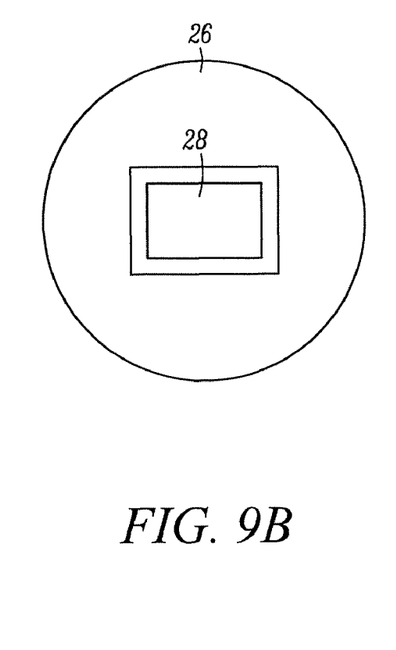
FIG. 9B is a top view of the nozzle of FIG. 9A.

The nozzle 10 comprises an inlet portion 12 defining at least one inlet conduit 14 for receiving at least one fluid and, in one embodiment, first and second fluids. An outlet portion 16 of the nozzle defines an exterior surface 18 and a plurality of apertures 22 extending through the exterior surface 18 in fluid communication with the inlet portion 12 and angularly spaced relative to each other about a central axis 24 of the outlet portion 16. Further, the outlet portion includes a plurality of bosses 26 or protuberances angularly spaced relative to each other about an axis of the outlet. Each boss defines an outlet aperture 28 therethrough that is in fluid communication with the at least one inlet conduit and an axially extending wall 30. In one embodiment, the axially extending wall 30 extends outwardly a length (X) greater than about ⅛ inch relative to the exterior surface 18 and has a wall thickness of about 5 mm or 3/16 inch. Typically, the bosses 26 are approximately cylindrical in shape and the outlet apertures are approximately circular. It should be noted, however, that numerous boss 26 and outlet aperture 28 configurations that are currently known or that later become known can be employed without departing from the spirit and scope of the invention; for example, an approximately cylindrical boss defining a rectangular outlet aperture can be employed as shown in FIGS. 9A-B. To ensure that the direction of the spray is along the axis of the aperture 22, the exit plane of the spray from each individual boss 26 is approximately perpendicular to the axis of the aperture 22 associated with the boss.

Figure 6A:
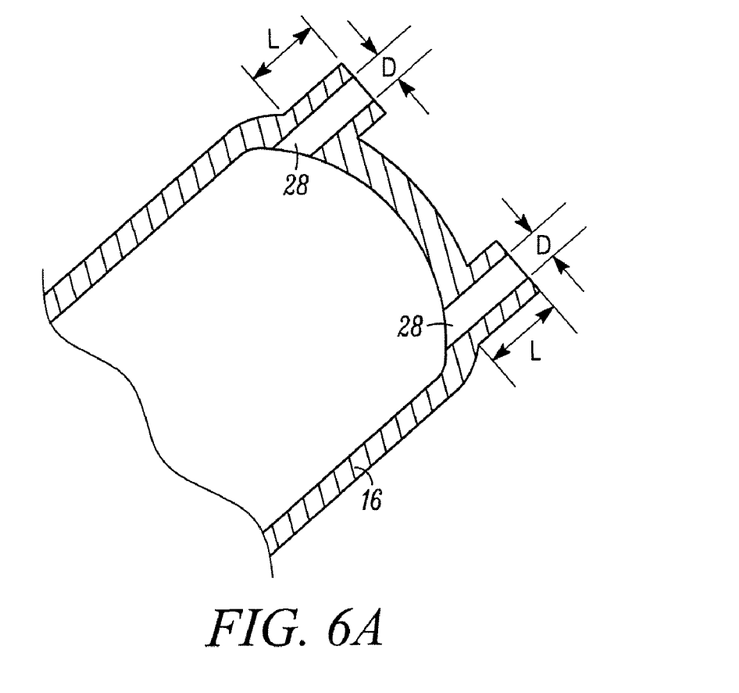
FIG. 6A is a partial side cutaway view of an embodiment of the nozzle of the present invention.
Figure 6B:
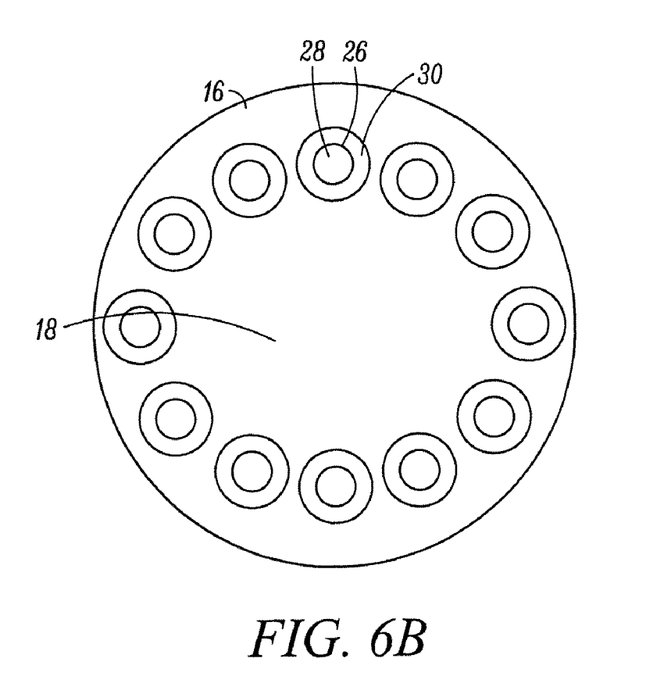
FIG. 6B is a top view of the nozzle of FIG. 6A.
Figure 7:
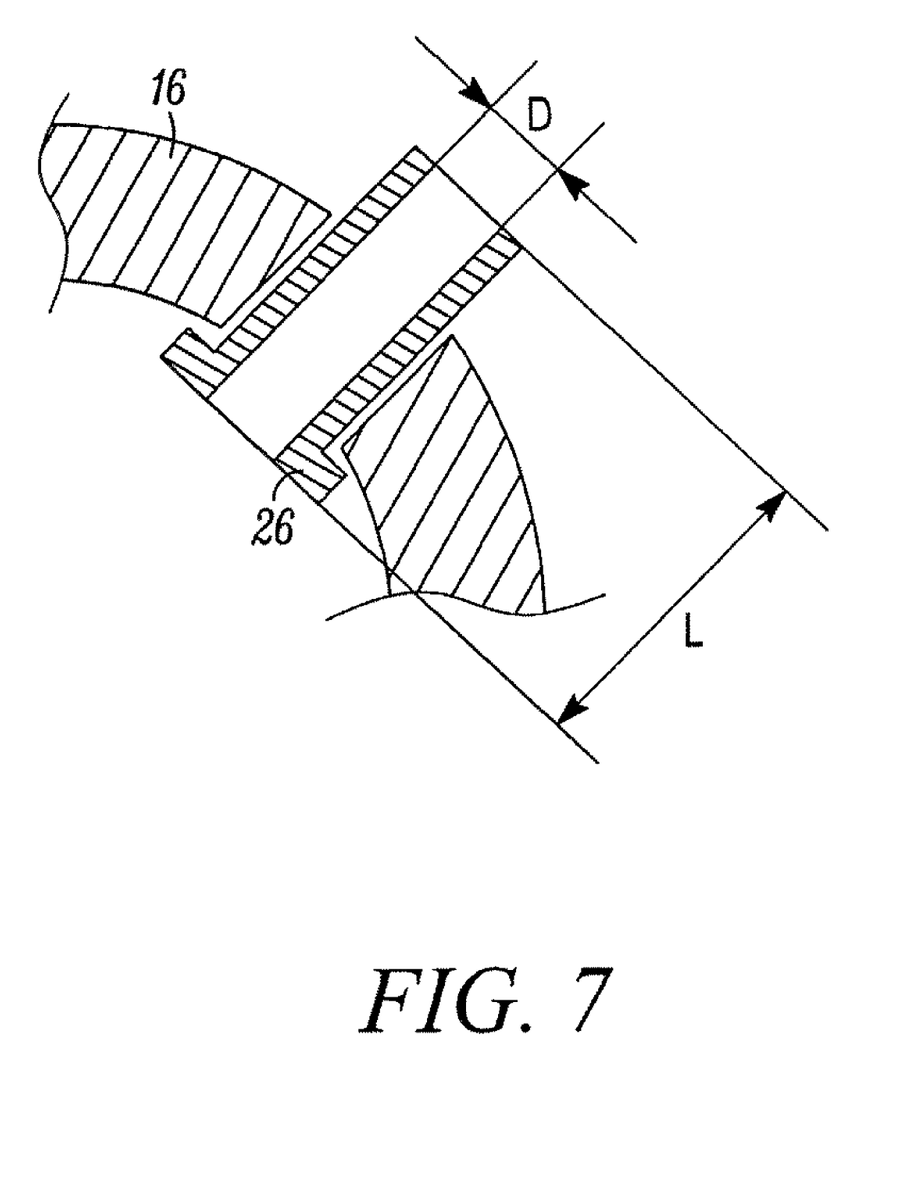
FIG. 7 is a partial side cutaway view of an embodiment of the nozzle of the present invention.
Figure 10:
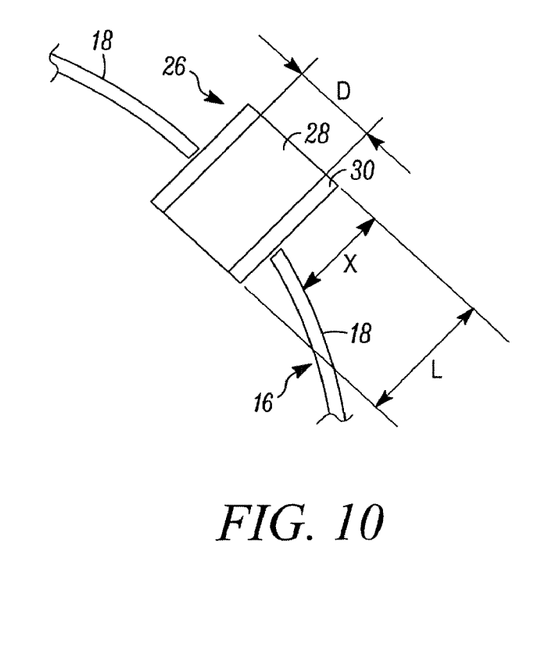
FIG. 10 is a partial side cutaway view of an embodiment of a boss of the present invention.

As shown in FIGS. 6A-B, 7 and 10, each outlet aperture 28 of each boss 26 has a length (L) and a diameter (D). In order to maintain a consistent and accurate spray pattern as the nozzle erodes in FCC applications or the like, the L/D ratio is maintained at least about ½, which is made possible by the addition of the boss 26 material in comparison to traditional nozzles without bosses. In the embodiments of FIGS. 7 and 10, a portion of the length (L) is located in the interior of the outlet 16. The additional material added by the bosses 26 allows more erosion to take place before the length of the outlet aperture L becomes too short, which in turn reduces the L/D ratio to less than about ½ causing the desired flat fan spray to become ill defined; as erosion continues further, an undesirable narrow cone spray pattern emerges, which negatively impacts the efficiency of the FCC or RCC processes or the like.

The outlet portion 16 and bosses 26 can be integrated as a single piece as shown in FIGS. 6A-B or, in an alternative embodiment (FIG. 7), the bosses 26 can be separate articles fitted into the apertures 22 of the outlet portion 16 and welded and/or mechanically fastened in place or held in place by any other suitable fastening method that is currently known or that later becomes known, so long as the bosses are held firmly in place. The latter embodiment offers the benefit that individual bosses 26 can be changed without having to replace the entire outlet portion 16 of the nozzle and, the bosses 26 can be made from a material that differs from the nozzle outlet 16.

The outlet apertures 22 preferably are configured to form a substantially flat fan spray pattern in accordance with the teachings of U.S. Pat. Nos. 5,553,783 and 5,692,682, both entitled "Flat Fan Spray Nozzle", and each of which is assigned to the Assignee of the present invention and is hereby expressly incorporated by reference in its entirety as part of the present disclosure. In accordance with the teachings of the foregoing patents, approximately all of the flow axes of the outlet apertures 22 are directed toward a target "T" (not shown) within the vessel for atomizing and directing a mixture of the first and second fluids in a spray pattern flowing in a direction across the target, and the target is substantially located within a plane extending in the flow direction of the spray pattern. In addition, the flow axis of each outlet aperture 22 is directed to intersect the target "T" such that the outlet apertures 22 cooperate to define a substantially flat fan spray pattern, and the target "T" is substantially located within a plane oriented at an acute angle relative to a vertical axis of the vessel. In one embodiment of the present invention, the target "T" is linear and approximately intersects the central axis of the end surface 18 of the outlet portion.

The nozzle 10 further comprises a mixing chamber (not shown) in fluid communication between the inlet portion 12 and the outlet portion 16 for mixing the at least one fluid therein. In one embodiment, the mixing chamber is formed within the outlet portion 16 immediately upstream of the outlet apertures 22.

In one embodiment, the nozzle 10 preferably further comprises at least one vane (not shown) located between the mixing chamber and inlet portion 12, and extending transversely relative to an elongated axis of the inlet portion for receiving a portion of the first and second fluids and creating a swirling annular flow, and defining at least a portion of an aperture in an approximately central portion thereof for receiving a portion of the first and second fluids and creating a substantially axial flow. The currently-contemplated vanes and the manner of incorporating each such vane in the nozzles of the present invention are shown in the commonly-assigned patents incorporated by reference above. In one such embodiment, each vane defines a substantially convex lobe and a substantially concave lobe. In this embodiment, each lobe is approximately semi-circular, and the convex lobe is located upstream relative to the concave lobe. Preferably, the nozzle comprises two vanes, wherein each vane extends transversely through a respective substantially semi-circular portion of the inlet portion 12. As an alternative to the vane(s), the nozzle may comprise a spray member (not shown) that helically extends in the direction from the inlet portion toward the outlet portion, as further described in the commonly-assigned patents incorporated by reference above.

The nozzle 10 is particularly suitable for use as a feed distributor in fluidized catalytic cracking units ("FCCU") and reduced crude conversion units ("RCCU"). FCCU and RCCU typically convert materials consisting essentially of petroleum-type hydrocarbons which are liquid at normal or a higher temperature and normal pressure, or recycled material, primarily to produce motor or other liquid fuels or naphthas of an average molecular weight lower than that of the charge stock, together with by-product normally gaseous hydrocarbons. The conversion is typically carried out:

a) at temperatures in excess of about 500 degrees Fahrenheit; and b) with a solid catalyst present in the reaction zone for the specific purpose of effecting or influencing the reaction and whereby there is produced a result as to yield, character of product or speed of reaction different to a definitely determinable degree from the result which would be produced with the same starting materials under conditions otherwise the same but in the absence of such catalyst.

Also typically in such units (1) the conversion and catalyst regeneration proceed in separate zones with transfer of catalyst between zones, (2) the catalyst is maintained in the reaction zone in the form of a fluid mass made up of finely divided solid catalyst dispersed in the hydrocarbon vapors undergoing conversion, and (3) the average residence time of the catalyst in the reaction zone is greater than the average residence time of the hydrocarbon vapors in the reaction zone.

Figure 8A:
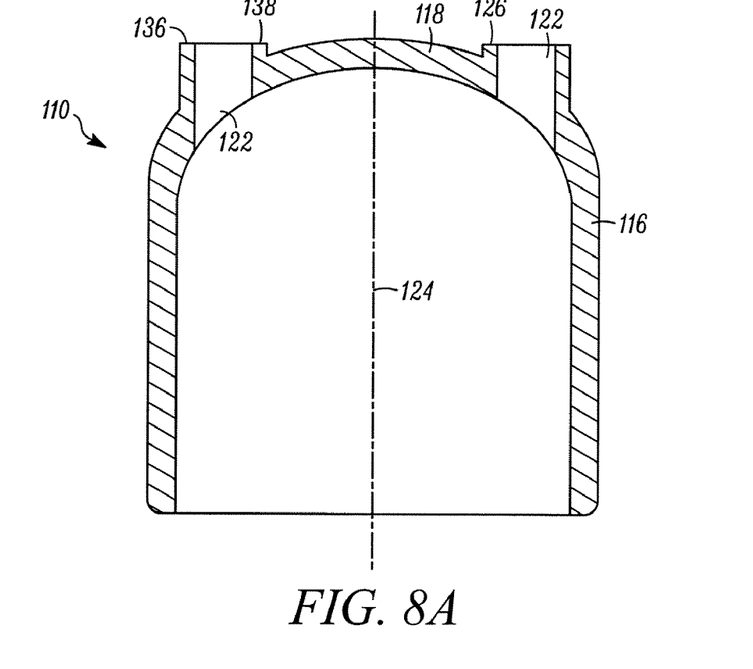
FIG. 8A is a partial side cutaway view of an embodiment of the nozzle of the present invention.
Figure 8B:
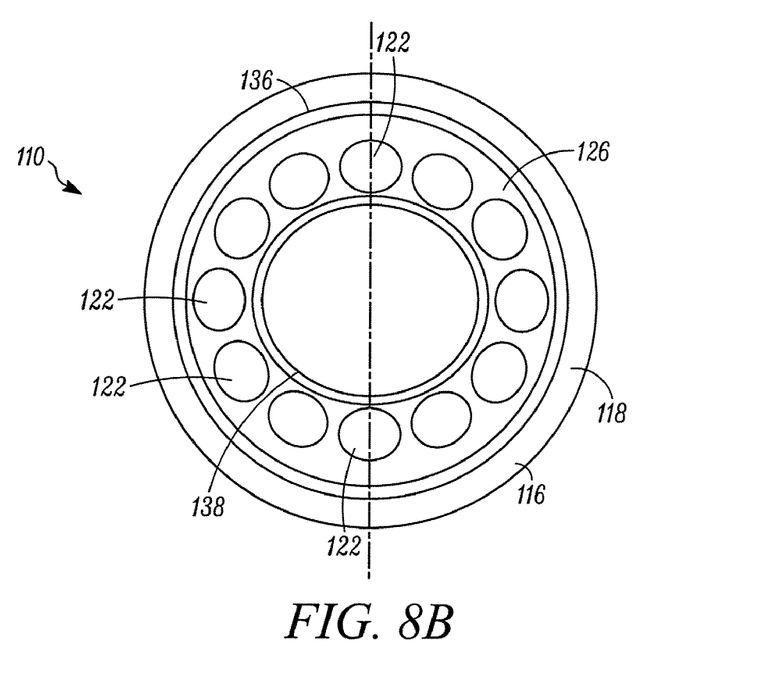
FIG. 8B is a top view of the nozzle of FIG. 8A.

In FIGS. 8A-8B, another embodiment of a nozzle of the present invention is indicated generally by the reference number 110. The nozzle 110 is similar in certain respects to the nozzle 10 described above with reference to FIGS. 5-7 and 10, and therefore like reference numerals preceded by the numeral "1" are used to indicate like elements. Like the nozzle 10, the nozzle 110 is provided for discharging first and second fluids in an atomized spray into a vessel (not shown). The nozzle 110 includes an inlet 112 and an outlet 116. The outlet 112 further defines an exterior surface 118 and two raised wall-like members 136, 138 that create a continuous boss 126 that surrounds the central axis 124 of the outlet 116. The continuous boss 126 defines a plurality of outlet apertures 122 through which the at least one fluid is discharged in a flat spray pattern such as the flat fan spray pattern described above. The raised wall like portions allow the boss to extend at least about ⅛ inch relative to the external surface 118 of the outlet 116. Each outlet aperture has a length (L) and diameter (D) such that the L/D ratio is maintained at at least about ½ to maintain the integrity of the spray pattern for an elongated period as the nozzle 110 erodes, relative to prior art nozzle configurations due to the added boss material. This embodiment is particularly useful in applications requiring larger diameter apertures where individual bosses could interfere with each other.

One advantage of the nozzles 10, 110 is that the inclusion of angularly spaced bosses 26 modifies catalyst flow patterns in the FCC vessel in the vicinity of the nozzle and makes nozzle less prone to (inhibits) the negative effects of erosion that occur in FCC processes or the like, thereby increasing the useful life of the nozzles in comparison to prior art spray nozzles. Another advantage of the nozzles 10, 110 is that the boss configuration maintains a minimum L/D ratio of at least about ½, which in turn, allows the nozzle 10 to discharge the at least one fluid in a consistently flat spray pattern into the catalyst or fluid stream in the vessel for an extended life cycle as erosion occurs. Yet another advantage of the nozzle 10 is that by maintaining a flat spray pattern, the FCC process becomes more efficient, as the fluid discharged from the nozzle interacts with the catalyst in a more consistent manner. Still another advantage of the nozzles 10, 110 is the bosses can be used to control the thickness of the flat fan or modify its shape. With the L/D ratio of at least about ½ provided by the addition of the bosses 26, 126, the spray jet so produced is narrower and better defined. This property can, for example, be used to make the flat fan thinner, which is an advantage in an FCC or RCC process because it ensures that oil/catalyst contact is more nearly instantaneous.

As may be recognized by those of ordinary skill in the pertinent art based on the teachings herein, numerous changes and modifications may be made to the above-described and other embodiments of the nozzles of the present invention without departing from the spirit and scope of the invention as defined in the appended claims. For Example, the nozzle bosses and outlet apertures can and take on numerous shapes and configurations that are currently known or that later become known. Furthermore, the orientation of the bosses and outlet apertures with respect to the central axis of the outlet can be altered. Still further, any of numerous different materials, outlet aperture configurations, spray pattern configurations, mixing chambers, mixing structures and/or atomizers, that are currently known, or that later become known, may be employed in the various nozzles of the present invention. Accordingly, this detailed description of currently preferred embodiments is to be taken in an illustrative, as opposed to a limiting sense.

What is claimed is:

1. A spray nozzle for discharging at least one fluid in a spray pattern into a fluid stream in a vessel, wherein the nozzle alters the flow patterns of the fluid stream in the vicinity of the nozzle to inhibit erosion of the nozzle and maintain the spray pattern, the nozzle comprising:

an inlet defining at least one inlet conduit; and an outlet in fluid communication with the inlet, the outlet defining an exterior surface and a plurality of bosses angularly spaced relative to each other about an axis of the outlet, each boss defining an outlet aperture in fluid communication with the at least one inlet conduit having a length (L) and a diameter (D) and an axially extending wall, wherein the axially extending wall extends outwardly a length (X) greater than about ⅛ inch relative to the exterior surface and L/D is at least about ½.

2. A nozzle as defined in claim 1, wherein the inlet receives a first fluid and a second fluid, and each outlet aperture defines a flow axis for directing a mixture of the first and second fluids in an atomized spray through the outlet aperture in the direction of the respective flow axis.

3. A nozzle as defined in claim 2, wherein approximately all of the flow axes of the outlet apertures are directed toward a target within the vessel for atomizing and directing a mixture of the first and second fluids in a spray pattern flowing in a flow direction across the target, and the target is substantially located within a plane extending in the flow direction of the spray pattern.

4. A nozzle as defined in claim 1, wherein the axially extending wall has a wall thickness of about 3/16 inch.

5. A nozzle as defined in claim 3, wherein the vessel is at least one of a catalytic cracking vessel and a reduced crude conversion vessel, the first fluid is a liquid, and the second fluid is a gas.

6. A nozzle as defined in claim 5, wherein the first fluid is oil and the second fluid is steam.

7. A nozzle as defined in claim 1, further comprising a mixing chamber in fluid communication between the inlet and the outlet for mixing first and second fluids therein.

8. A nozzle as defined in claim 7, further comprising at least one vane located between the mixing chamber and inlet, and extending transversely relative to an elongated axis of the inlet for receiving a portion of the first and second fluids and creating a swirling annular flow, and defining at least a portion of an aperture in an approximately central portion thereof for receiving a portion of the first and second fluids and creating a substantially axial flow.

9. A spray nozzle for discharging at least one fluid in a spray pattern into a fluid stream in a vessel, wherein the nozzle alters the flow patterns of the fluid stream in the vicinity of the nozzle to inhibit erosion of the nozzle and maintain the spray pattern, the nozzle comprising:
an inlet defining at least one inlet conduit;
an outlet in fluid communication with the inlet, the outlet defining an exterior surface and a plurality of apertures angularly spaced relative to each other about an axis of the outlet; and
a plurality of boss members, each boss member fitted within a respective aperture and defining an outlet aperture in fluid communication with the at least one inlet conduit having a length (L) and a diameter (D) and an axially extending wall, wherein the axially extending wall extends outwardly a length (X) greater than about 1/8 inch relative to the exterior surface and L/D is at least about 1/2.

10. A nozzle as defined in claim 9, wherein the inlet receives a first fluid and a second fluid, and each outlet aperture defines a flow axis for directing a mixture of the first and second fluids in an atomized spray through the outlet aperture in the direction of the respective flow axis.

11. A nozzle as defined in claim 10, wherein approximately all of the flow axes of the outlet apertures are directed toward a target within the vessel for atomizing and directing a mixture of the first and second fluids in a spray pattern flowing in a flow direction across the target, and the target is substantially located within a plane extending in the flow direction of the spray pattern.

12. A spray nozzle as defined in claim 9, wherein the axially extending wall has a wall thickness of about $3/16$ inch.

13. A nozzle as defined in claim 11, wherein the vessel is at least one of a catalytic cracking vessel and a reduced crude conversion vessel, the first fluid is a liquid, and the second fluid is a gas.

14. A nozzle as defined in claim 13, wherein the first fluid is oil and the second fluid is steam.

15. A nozzle as defined in claim 9, further comprising a mixing chamber in fluid communication between the inlet and the outlet for mixing first and second fluids therein.

16. A nozzle as defined in claim 15, further comprising at least one vane located between the mixing chamber and inlet, and extending transversely relative to an elongated axis of the inlet for receiving a portion of the first and second fluids and creating a swirling annular flow, and defining at least a portion of an aperture in an approximately central portion thereof for receiving a portion of the first and second fluids and creating a substantially axial flow.

17. A nozzle as defined in claim 9, wherein each boss member is held into place within the respective aperture by welding, mechanical fastening or any combination thereof.

18. A nozzle as defined in claim 9, wherein at least one of the boss members is made from a material that differs from the outlet material.

19. A spray nozzle for discharging at least one fluid in a spray pattern into a fluid stream in a vessel comprising:

first means for receiving the at least one fluid;

second means in fluid communication with the first means for emitting the at least one fluid in a spray pattern therefrom; and third means in fluid communication with at least one of the first and second means for altering flow patterns of the fluid stream in the vicinity of the nozzle to inhibit erosion of the nozzle and maintain the spray pattern, wherein the third means comprises a plurality of boss members, each boss member fitted within an aperture of said second means and defining an outlet aperture having a length (L) and a diameter (D) and an axially extending wall, wherein the axially extending wall extends outwardly a length (X) greater than about $1/8$ inch relative to an exterior surface of the second means and L/D is at least about $1/2$.

20. A nozzle as defined in claim 19, wherein the first means is an inlet member defining at least one inlet conduit for receiving the at least one fluid, and the second means is an outlet member in fluid communication with the inlet member, the outlet member defining the exterior surface and a plurality of said apertures in said second means angularly spaced relative to each other about an axis of the outlet member.

21. A method of maintaining a spray pattern of at least one fluid sprayed by a nozzle into a fluid stream of a vessel and inhibiting erosion of the nozzle, comprising the steps of:

providing a spray nozzle for discharging at least one fluid in a spray pattern into the vessel, wherein the spray nozzle comprises an inlet member defining at least one inlet conduit for receiving at least one fluid, and an outlet member in fluid communication with the inlet member, the outlet member defining an exterior surface and a plurality of apertures angularly spaced relative to each other about an axis of the outlet member;

introducing a fluid stream into the vessel;

providing a plurality of boss members, each boss member fitting within a respective aperture and defining an outlet aperture in fluid communication with the at least one inlet conduit having a length (L) and a diameter (D) and an axially extending wall, wherein the axially extending wall extends outwardly a length (X) greater than about $1/8$ inch relative to the exterior surface and L/D is at least about $1/2$.

22. A method as defined in claim 21, wherein the vessel is at least one of a catalytic cracking vessel and reduced crude conversion vessel.

23. A method as defined in claim 21, wherein the fluid stream is a catalyst stream and the at least one fluid is an atomized mixture of oil and steam.

24. A spray nozzle for discharging at least one fluid in a spray pattern into a fluid stream in a vessel, wherein the nozzle alters the flow patterns of the fluid stream in the vicinity of the nozzle to inhibit erosion of the nozzle and maintain the spray pattern, the nozzle comprising:

an inlet defining at least one inlet conduit; and an outlet in fluid communication with the inlet, the outlet defining an exterior surface and two wall members forming a single continuous boss around a central axis of the outlet, the continuous boss defining a plurality of outlet apertures having a length (L) and a diameter (D) angularly spaced relative to each other about the central axis of the outlet and in fluid communication with the at least one inlet conduit, wherein the wall members extend outwardly a length (X) greater than about ⅛ inch relative to the exterior surface and L/D is at least about ½.

25. A nozzle as defined in claim 1, wherein each boss has sufficient material to maintain L/D at least about ½ until a predetermined amount of nozzle erosion occurs.

26. A nozzle as defined in claim 1, wherein the outlet defines an interior and at least a portion of the length (L) is located in the interior of the outlet.

27. A nozzle as defined in claim 9, wherein each boss member has sufficient material to maintain L/D at least about ½ until a predetermined amount of nozzle erosion occurs.

28. A nozzle as defined in claim 9, wherein the outlet defines an interior and at least a portion of the length (L) is located in the interior of the outlet.

29. A nozzle as defined in claim 19, wherein each boss member has sufficient material to maintain L/D at least about ½ until a predetermined amount of nozzle erosion occurs.

30. A nozzle as defined in claim 20, wherein the outlet member defines an interior and at least a portion of the length (L) is located in the interior of the outlet.

31. A method as defined in claim 21, wherein the step of providing a plurality of boss members further comprises providing each boss member with sufficient material to maintain L/D at least about ½ until a predetermined amount of nozzle erosion occurs.

32. A method as defined in claim 21, wherein the step of providing a spray nozzle further comprises the outlet member defining an interior, and the step of providing a plurality of boss members further comprises providing at least a portion of the length (L) in the interior of the outlet member.

33. A method as defined in claim 21, further comprising replacing each boss member when L/D thereof is less than about ½.

34. A nozzle as defined in claim 24, wherein the continuous boss has sufficient material to maintain L/D at least about ½ until a predetermined amount of nozzle erosion occurs.

35. A nozzle as defined in claim 24, wherein the outlet defines an interior and at least a portion of the length (L) is located in the interior of the outlet.

* * * * *